(12) United States Patent
Metcalfe et al.

(10) Patent No.: US 7,306,462 B2
(45) Date of Patent: Dec. 11, 2007

(54) GAS OPERATING SYSTEM FOR FIREARM SIMULATORS

(75) Inventors: Corey Howard Metcalfe, Savannah, GA (US); Henry Martin Wilson, Jr., Buford, GA (US); Paul Heath Fleming, Sugarhill, GA (US)

(73) Assignee: FATS, Inc., Suwanee, GA (US)

( * ) Notice: Subject to any disclaimer, the term of this patent is extended or adjusted under 35 U.S.C. 154(b) by 150 days.

(21) Appl. No.: 10/631,944

(22) Filed: Jul. 31, 2003

(65) Prior Publication Data

US 2005/0074726 A1    Apr. 7, 2005

Related U.S. Application Data

(60) Provisional application No. 60/402,464, filed on Aug. 9, 2002.

(51) Int. Cl.
*F41A 33/00* (2006.01)

(52) U.S. Cl. .............................. 434/18; 434/11; 434/16; 434/19; 434/21; 89/27.11; 42/106; 137/625.2; 137/625.25; 137/625.26; 137/625.27

(58) Field of Classification Search ................. 434/11, 434/16, 18, 19, 21; 463/2, 5; 446/401, 405, 446/406; 436/2, 5; 124/55; 89/27–28; 42/106; 137/625.27, 625.2, 625.25, 625.26
See application file for complete search history.

(56) References Cited

U.S. PATENT DOCUMENTS

| 2,023,497 | A |   | 12/1935 | Trammell |       |
|-----------|---|---|---------|----------|-------|
| 3,072,289 | A |   | 1/1963  | Stopp    |       |
| 3,306,168 | A |   | 2/1967  | Blumrick |       |
| 4,194,304 | A |   | 3/1980  | Wolcott  |       |
| 4,302,190 | A |   | 11/1981 | Shaw et al. |    |
| 4,380,437 | A | * | 4/1983  | Yarborough, Jr. ............ 434/18 |
| 4,465,959 | A |   | 8/1984  | Yajima   |       |
| 4,480,999 | A |   | 11/1984 | Witherell |      |
| 4,678,437 | A |   | 7/1987  | Scott    |       |
| 4,770,153 | A | * | 9/1988  | Edelman ...................... 124/72 |
| 4,812,122 | A | * | 3/1989  | Mueller ...................... 434/18 |
| 4,823,401 | A |   | 4/1989  | Gammarino |     |
| 4,877,403 | A |   | 10/1989 | Jurgens  |       |
| 4,898,205 | A |   | 2/1990  | Ross     |       |
| 4,951,644 | A |   | 8/1990  | Bon      |       |
| 5,368,022 | A |   | 11/1994 | Wagner   |       |

(Continued)

FOREIGN PATENT DOCUMENTS

DE    24 21 726    5/1974

(Continued)

*Primary Examiner*—Xuan M. Thai
*Assistant Examiner*—Andrew Kim
(74) *Attorney, Agent, or Firm*—Smith, Gambrell & Russell LLP

(57) ABSTRACT

A removable gas supply for a weapon simulator, wherein the gas system cycles the bolt or slide of the firearm to provide recoil, actuate a hammer/trigger mechanism and provide realism of the original weapon functions. The weapon simulator has a housing defining a piston chamber and a piston positioned in said chamber and connected to the bolt. The simulator also includes a valve chamber in the housing connected with said regulated gas supply and said bolt, and a recoil valve positioned in the valve chamber to control the release of gas from said regulated gas supply to said piston chamber to generate recoil in the weapon simulator.

15 Claims, 4 Drawing Sheets

U.S. PATENT DOCUMENTS

| | | | |
|---|---|---|---|
| 5,392,865 A * | 2/1995 | Piras | 173/17 |
| 5,427,380 A | 6/1995 | Hazard | |
| 5,560,549 A | 10/1996 | Ricco et al. | |
| 5,569,085 A | 10/1996 | Igarashi | |
| 5,591,032 A | 1/1997 | Powell | |
| 5,788,500 A | 8/1998 | Gerber | |
| 5,816,817 A | 10/1998 | Tsang | |
| 5,823,779 A | 10/1998 | Muehle | |
| 5,842,300 A | 12/1998 | Cheshelski | |
| 5,892,221 A | 4/1999 | Lev | |
| 5,937,563 A | 8/1999 | Schuetz | |
| 5,947,738 A | 9/1999 | Muehle | |
| 5,980,254 A | 11/1999 | Muehle | |
| 6,041,762 A | 3/2000 | Sirosh | |
| 6,112,636 A | 9/2000 | Besselink | |
| 6,146,141 A * | 11/2000 | Schumann | 434/11 |
| 6,186,168 B1 | 2/2001 | Schultz | |
| 6,283,756 B1 | 9/2001 | Danckwerth | |
| 6,343,599 B1 | 2/2002 | Perrone | |
| 6,349,711 B1 | 2/2002 | Perry et al. | |
| 6,509,896 B1 * | 1/2003 | Saikawa et al. | 345/419 |
| 2003/0056778 A1 | 3/2003 | Schavovne | |
| 2003/0101979 A1 | 6/2003 | Schavovne | |

FOREIGN PATENT DOCUMENTS

DE         3631262 A1 * 9/1986

* cited by examiner

GAS OPERATING SYSTEM FOR FIREARM SIMULATORS

CROSS REFERENCE TO RELATED APPLICATIONS

The present application claims priority to U.S. Provisional Patent Application No. 60/402,464, filed on Aug. 9, 2002.

BACKGROUND OF THE INVENTION

1. Field of the Invention

The present invention relates to firearm simulators.

2. Description of the Prior Art

Because of the lethal characteristics inherent in operating guns, proper training in their use is imperative. Such training often involves the firing of blanks or live ammunition. Load noise, spent cartridge waste, noxious burned powder odors, repetitive reloading, environmental constraints, high cost and overall danger are all substantial detriments to the use of blanks or live ammunition.

To overcome the above disadvantages, training devices have evolved for simulating the firing of guns. These devices relate to weaponry having primarily military use. U.S. Pat. No. 4,302,190 discloses a rifle recoil simulator whereby compressed air passes through orifices in the rifle barrel to force the barrel upward in a recoil motion. A trigger switch activates an electronic timer-solenoid-air valve system for controlling air passage to the barrel orifices.

Artillery loading and recoil simulators are described in U.S. Pat. Nos. 4,194,304 and 4,365,959. These are complex mechanisms designed to train entire gunnery crews. They are not directly related to firearm recoil, which is the subject of the present invention.

To improve the realism of the weapons familiarization process and to provide a more "lifelike" experience, a variety of approaches have been suggested to make the weapons range more realistic. For example, some weapons ranges provide paper targets with threatening images rather than bull's-eye targets. In attempts to present a more realistic scenario to the participant and to provide an interactive and immersive experience, some weapons ranges have replaced such fixed targets with moving or "pop-up" targets such as spring-loaded mechanical images or animated video images projected onto a display screen. The pop-up or animated images present moving targets and/or simulated return threats toward which the participant fires. One problem with such an approach is that the bullets damage or destroy the target. For example, the bullets can punch holes through display screens, eventually rendering the screens inoperative. Further, use of live ammunition can be very dangerous, especially in unfamiliar training exercises where the participant's performance limits are tested.

To address such problems, some training ranges use non-lethal ammunition, such as projectiles propelled by air cartridges in place of conventional bullets. One type of non-lethal ammunition is a Crown Type E air cartridge. In conventional uses of such cartridges, a releasable cap attaches to the cartridge and covers an outlet port. Then, when the outlet port is opened, a highly pressurized gas is released from the cartridge and propels the releasable cap away from the cartridge at a high velocity. The cap travels through a gun barrel and is emitted from the gun as a non-lethal projectile. To detect the impact locations of the non-lethal projectile, some such ranges use some type of projectile tracking device, such as high-speed imaging equipment. Such ranges can be very expensive due to their complexity and use of specialized equipment.

Other ranges allow the non-lethal ammunition to penetrate or otherwise mark a target object to indicate impact location. Such ranges have the drawback that the non-lethal ammunition is destructive. Additionally, the impact locations are difficult to track on a "real-time" basis, which makes interactive ranges difficult. Also, while such approaches may improve visual approximations of actual situations as compared to paper targets, such approaches lack a visual or other virtually instantaneous feedback indicating the effectiveness of the participant's fire.

Another alternative type of weapons range employs a light beam in place of a projectile. In such ranges, the participant holds a simulated weapon shaped like a conventional weapon that is activated by a switch coupled to a conventionally shaped and positioned trigger. When the participant pulls the trigger, the simulated weapon emits a light beam that strikes the target, causing an illuminated spot. An optical detector detects the spot and indicates the impact location.

Such simulated weapons lack a realistic feel because they do not recoil in response to the simulated fire. Moreover, the simulated weapons do not emit shells that can distract the participant and can affect the participant's footing.

To try to simulate an actual weapon's recoil, a compressed air line can be coupled to the simulated weapon. Then, when the trigger is pulled, an air driven mechanism applies a pulse of force to the simulated weapon to produce a simulated recoil. Such a system has the drawback that the air line acts as a tether, limiting the participant's mobility and affecting aim. The system also lacks the ejected shells of actual or non-lethal ammunition.

The prior art attempts, including those described in U.S. Pat. Nos. 5,947,738 5,569,085, 4,480,999, and 4,678,437, to simulate recoil have limitations and drawbacks as discussed above in addition to being tethered to a console, lack of proper feel and balance, and related problems, all of which are solved by the present invention.

BRIEF SUMMARY OF THE INVENTION

The present invention is a firearm simulator that contains all of the necessary gas energy to operate itself and yet is electrically controlled and completely self-contained within the profile of the original weapon and with no lines or hoses protruding. The self-contained gas system allows for full simulator function and student mobility combined with computer control of the weapon. Computer control is desirable to achieve a higher level of realism, to provide more training functions than a strictly mechanical simulator and to allow for remote communication and control.

In addition, the gas supply is housed within a simulated, removable magazine and is replenished by changing the magazine to a new one in the same fashion as is done on a live weapon. Thus, the student is trained to correctly reload the weapon by changing magazines. The gas in the magazine can be quickly recharged while the magazine is not being used in the weapon.

Also, the weapon simulator is not required to use explosives/flammables or to expel any solid material including cartridges or projectiles in order to create its cycling and recoil. This makes the weapon trainer safer, easier to use and allows for a more reliable function. Without projectiles, the weapon barrel may contain a laser device for purposes of providing weapon aiming information.

Furthermore, the weapon simulator includes one recoil valve to produce the desired recoil to mimic an actual firearm.

DESCRIPTION OF THE PREFERRED EMBODIMENT

Figure 1:
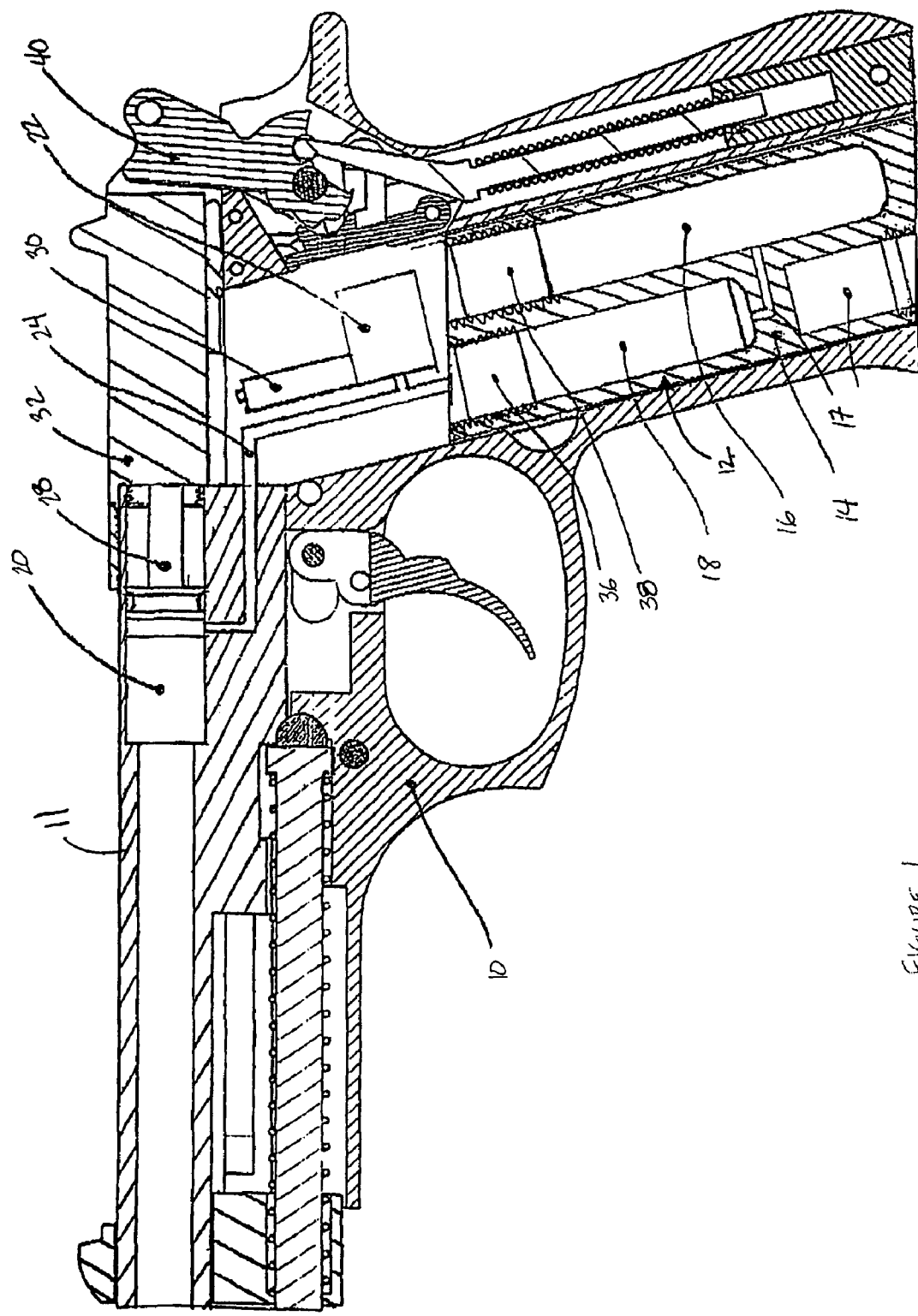
FIG. 1 is a sectional side view of one embodiment of the weapon simulator having a controlled gas operating system of the present invention.

Referring to FIG. 1, one embodiment of the present invention of a firearm or weapon simulator 10 is illustrated. The weapon simulator 10 incorporates the use of an internal, regulated gas system 12 that is used to cycle the weapon simulator 10 and provide recoil in the weapon simulator 10 for the user. The gas system 12 is present in a removable magazine 14 that is contained entirely within the weapon simulator 10 and requires no external hoses, wires or connections of any kind. The use of this gas system 12 can be incorporated into various firearm designs, such as auto-loading rifles and pistols.

The magazine 14 of the present invention may be easily inserted and removed from the weapon simulator 10, and contains the gas supply that is needed to operate the weapon simulator 10. More precisely, the gas supply is contained in a built-in primary gas chamber 16 in the removable magazine 14. The high-pressure gas supply allows storage of sufficient energy to power the recoil for the simulated weapon simulator 10 in correlation with the number of shots normally fired from a conventional, fully-loaded live magazine in a live weapon.

The high-pressure gas supply is reduced to a medium pressure in the present invention using a built-in regulator chamber 18 located in the magazine 14. The regulator chamber 18 is connected to the primary gas chamber 16 via a narrow gas conduit 17. The medium gas pressure from the regulator chamber 18 thereby allows the use of miniaturized electric valves 20, 22 in the weapon simulator 10; that is, the safe supply of gas to the electric valves 20, 22 is through various small gas ports 24. There are two electric valves 20, 22 in the preferred embodiment: a recoil valve 20 and a locking valve 22. Each valve 20, 22 is powered from an electrical supply (such as a battery) that may be contained within the weapon simulator 10. The electric valves 20, 22 are turned on or off to deliver gas to a recoil cylinder/piston assembly 28 and a locking cylinder/piston assembly 30.

The recoil cylinder/piston assembly 28 includes a piston that is used to drive a slide 32 or bolt of the weapon simulator 10. The slide 32 is driven in a direction to accomplish all of the following: cycle the weapon simulator 10, function a hammer/trigger mechanism 34, and produce recoil in the weapon simulator 10. The locking cylinder/piston assembly 30 includes a piston that is used as a binding mechanism to lock the slide 32 (or bolt) back when the weapon ammunition condition is simulated empty. That is, the locking cylinder/piston assembly 30 extends the piston as directed by the locking valve 22 to prevent the movement of the slide 32 after the weapon simulator 10 has fired a predetermined number of rounds.

A quick-connect fitting 36 with flow shut-off is used to connect the gas from the magazine 14 to the weapon simulator 10 internally and allows for removal and insertion of the magazine 14 in a similar manner as the live weapon at any time. A second quick-connect fitting 38 with flow shut-off is used for filling the magazine gas chamber 14. The gas supply in gas chamber 14 is thereby recharged by removing the magazine 12 from the weapon simulator 10 and momentarily connecting it to a commercially-available high-pressure compressed-gas tank or vessel (not illustrated).

As discussed above, there are numerous firearm simulator trainers available on the market today. Many law enforcement, military and government agencies use weapon simulators to train their people. These trainers simulate the operation of a live weapon for the purpose of teaching the student to operate the weapon and to learn to use it against intended targets under various situations and conditions without the danger, effort, and expense of using live ammunition. To simulate the operation of a weapon design that is auto-loading and contains a moving bolt or slide assembly, a gas system is often employed. This system is used to drive the bolt or slide rearward to cycle the weapon as is similar in a live weapon. Weapon recoil is also simulated by nature of the bolt/slide being driven back toward the rear against a recoil spring and often impacted against a part of the weapon. These forces push the weapon against the body of the shooter to provide a recoil force. Most of the auto-loading weapon designs being simulated also contain a removable magazine which holds a supply of ammunition for the weapon to fire. This feature is often included in weapon simulators to provide training for weapon reloading, immediate action drills for weapon jamming, and related situations. The gas systems currently and typically used in these types of simulators are summarized as follows.

A first common type of gas system uses low-pressure, 80-200 psi gas. This gas is supplied by an externally regulated, commercially available high-pressure compressed gas tank or by a source which actually compresses the low-pressure gas on site. One of the limitations of this system is that it requires a hose or line running from the weapon to a tank or compressor while the weapon is in use. The hose detracts from the mobility of the weapon/shooter because it is attached to a fixed, compressed gas supply or bulky portable compressed gas tank. The realism of the simulator is reduced because the hose protrudes from the weapon, which detracts from the look and feel of a live weapon. Another limitation is that the low-pressure typically requires large valves, cylinders and air passages to provide sufficient flow and area to produce the forces required to cycle the weapon and produce recoil. In the case of a pistol, the valves must be located external to the weapon which adds bulk and further detracts from the realism of the simulator.

A second type of gas system uses cartridges which contain high-pressure compressed gas. These cartridges are triggered by being struck with the weapon firing pin and they cycle the weapon with their rapid expansion and/or by gas expulsion which may also propel a projectile. The cartridges are loaded into the weapon magazine, chambered, fired, extracted and ejected in similar fashion to the live weapon. The cartridges are designed to be re-usable. The outside profile of the simulator is the same as the live weapon. The limitations to this system are numerous. These include the high cost of the individual rounds which also wear out and can be damaged. The fact that each round must be individually charged and loaded into the gun magazine is very tedious and time-consuming to the user. The fact that the rounds are ejected exposes them to damage when stepped on and requires that they be individually collected. The fact that the cartridges occupy the magazine and must follow a path through the weapon removes much needed space for electronics and sensors in more advanced simulators. The fact that the simulated weapon must chamber, fire, extract and eject a cartridge for each shot in a similar manner as the original weapon and with much less energy causes the simulator to be less reliable than other types of firearm simulators.

A third type of gas system uses cartridges which contain an explosive/propellant. These cartridges are triggered by being struck with the weapon firing pin and they cycle the weapon with their rapid expansion and/or by gas expulsion which may also propel a projectile. The cartridges are designed to be disposable. The outside profile of the simulator is the same as the live weapon. The cartridges are loaded into the weapon magazine, chambered, fired, extracted and ejected in similar fashion to the live weapon. There are several limitations to this system. The fact that shells must be individually loaded into the magazine is time-consuming to the user. The fact that the expelled rounds lie on the floor/ground and must be collected and discarded is messy and causes additional work to the user. The fact that the cartridges occupy the magazine and must follow a path through the weapon removes much-needed space for electronics and sensors in more advanced simulators. The fact that the simulated weapon must chamber, fire, extract and eject a cartridge for each shot in a similar manner as the original weapon and with much less energy causes the simulator to be less reliable than other types of firearm simulators.

The present invention solves all of the limitations of the above-mentioned systems. Comparing the present design with the other gas systems described above, it is clear to see the limitations eliminated by the present invention. For example, comparing the present invention to the first gas system described above, the gas system 12 of the present invention is completely contained within the weapon simulator 10. By storing compressed gas within the magazine 14 that is also at high-pressure, there is sufficient amount of gas energy within the weapon simulator 10 to cycle the weapon simulator 10. The high-pressure gas can be used safely in the weapon simulator 10 through electric valve control because it is reduced in pressure through a regulator system also internal to the weapon simulator 10. Thus, no hoses or external connections to the weapon are needed or used. In addition, because the weapon simulator 10 operates at a medium gas pressure which is higher than the existing low-pressure systems, the electric valves 20, 22, cylinders and air passages can be miniaturized. Thus, the electric valves 20, 22 can be contained within the weapon simulator 10 by careful design, even in the case of when the weapon simulator 10 is a small firearm, such as a pistol or the like.

Comparing the present invention to the second gas system described above, various limitations of the previous system are solved by the present invention. Since the present compressed gas system 12 does not use cartridges that would have to cycle through the weapon simulator 10, there are no cartridges to purchase, wear out, or damage. Recharging of the gas system 12 occurs only once for each time that a real weapon magazine would be reloaded. Since magazines 14 can typically hold from eight to thirty cartridges, this saves numerous rechargings per magazine 14 used. That is, the present invention does not require consistent recharging of the plurality of cartridges. In addition, no cartridges need to be loaded into the magazine 14 for proper operation. Therefore, this weapon simulator 10 is much easier to use. A related benefit is that there are no cartridges to collect from the ground/floor and no rounds are exposed to damage by being stepped on. The weapon simulator 10 is much more adaptable to electronics because there is no space lost due to cartridges from the magazine 14 and through the weapon simulator 10 and because the gas flow is controlled by electric valves 20, 22. Because there are fewer moving parts without cartridges and because the chambering, firing, ejecting and extracting functions do not have to be literally performed in the weapon simulator 10 for each shot, the simulator with the present gas system is more reliable both per-shot and over-all.

The third gas system also has limitations are solved by the present design. In particular, with the present invention, recharging occurs only once for each time that a real weapon magazine would be reloaded. Since magazines can typically hold from eight to thirty cartridges, this saves numerous rechargings per magazine 14 used. In addition, no cartridges need to be loaded into the magazine 14 of the present invention. Therefore, this weapon simulator 10 is much easier to use. As discussed above, since no cartridges are expelled, there is no "clean-up" necessary for the user. Moreover, the gas system 12 is much more adaptable for use with electronics because there is no space lost due to cartridges from the magazine and through the weapon, and also because the gas flow is controlled by electric valves 20, 22. Because there are fewer moving parts without cartridges and because the chambering, firing, ejecting and extracting functions do not have to be literally performed in the weapon for each shot, the simulator with this gas system 12 is more reliable both per-shot and over-all.

Figure 2:
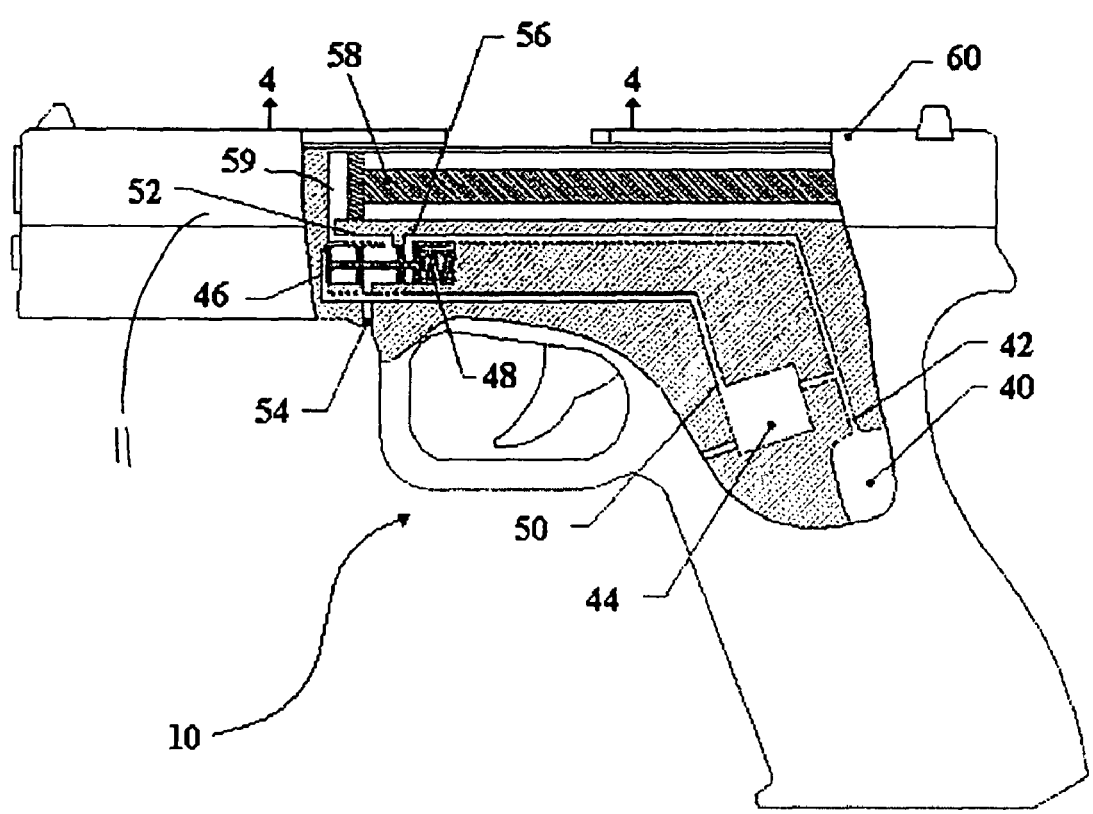
FIG. 2 is a sectional side view of another embodiment of the weapon simulator having a controlled gas operating system of the present invention.
Figure 3:
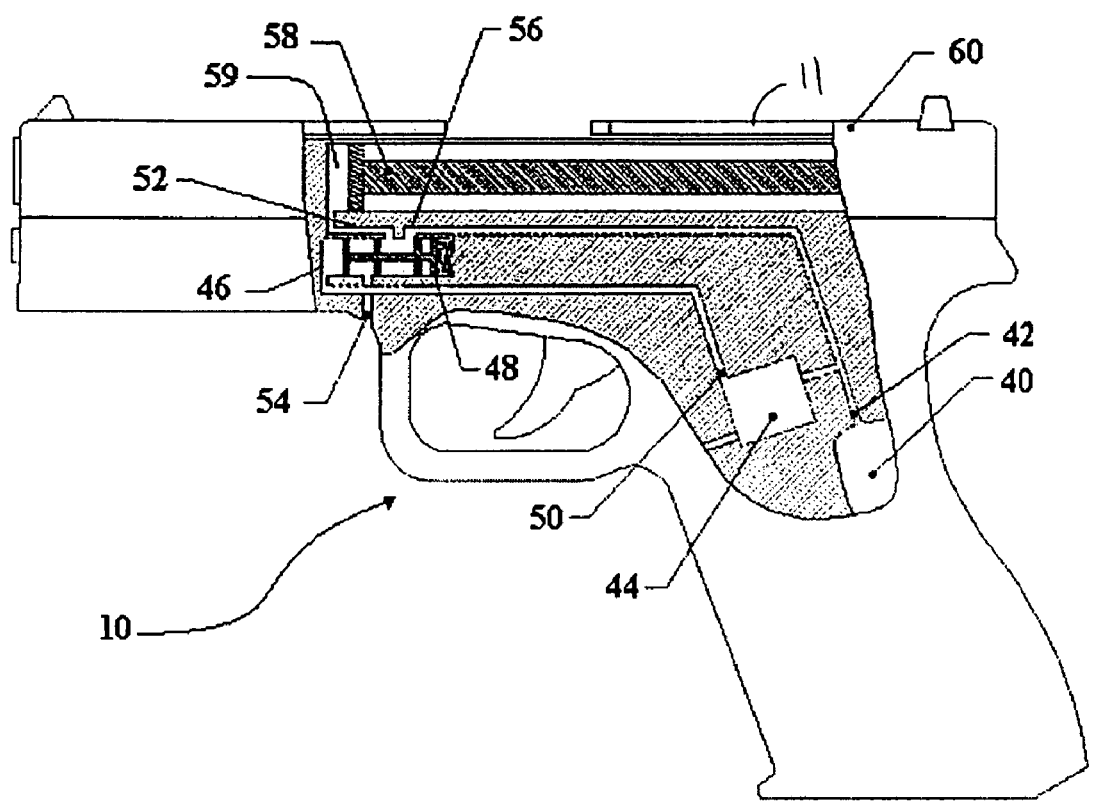
FIG. 3 is a sectional side view of the weapon simulator illustrated in FIG. 2 with the weapon simulator having been discharged.
Figure 4:
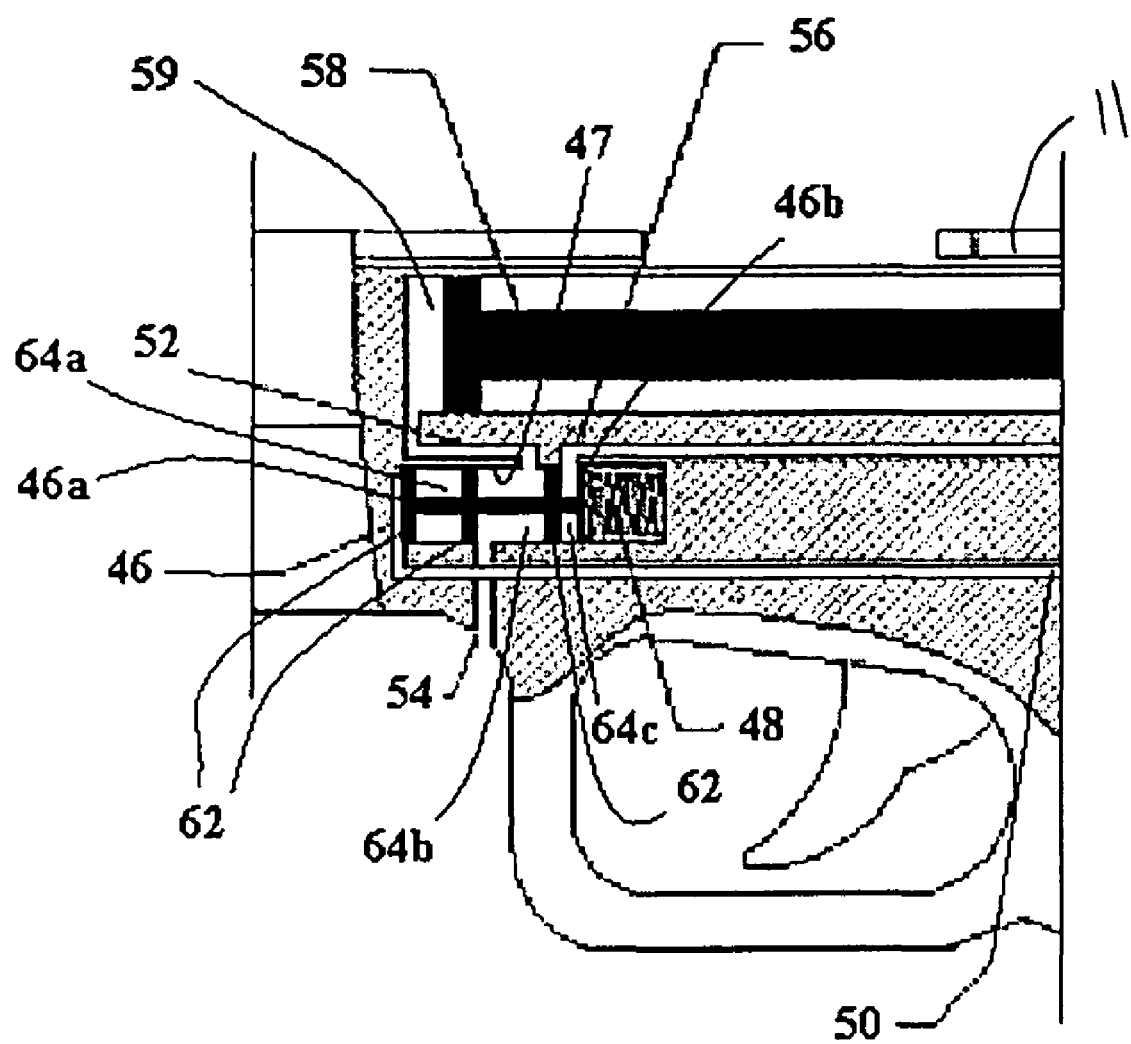
FIG. 4 is a sectional view of the recoil valve taken from lines 4-4 of FIG. 2.

Another embodiment of the invention is illustrated in FIGS. 2 through 4. In this embodiment, a low-pressure gas supply 40 is used in the weapon simulator 10 in conjunction with a small, low-pressure, electrically operated pilot valve (not illustrated) that drives a larger, operated pilot valve 44. The weapon simulator 10 includes a firearm housing 11 or frame, with a cylinder and piston assembly having a piston 58 positioned in a piston chamber 59 contained within the firearm housing 11. The pilot valve 44 furthermore drives the piston assembly as desired. This arrangement allows the use of very small, low-pressure electrically operated pilot valve 44, while still providing sufficient flow for adequate recoil to accurately simulate the operation of a firearm. It should be noted that the pilot valve 44 is connected to the gas supply 40, and also to the valve chamber 47 by pilot channel 50.

In particular, the low-pressure gas supply 40 is fed to both a distal end 46a of a recoil valve 46 and the pilot valve 44 via gas supply channel 42. The recoil valve 46 preferably includes four valve gates 62 or flanges, and the recoil valve 46 is slidably positioned in the valve cavity 47 with the valve gates 62 abutting the walls of the valve cavity 47. The valve gates 62 further define a series of valve cavities: a distal valve cavity 64a, a central valve cavity 64b, and a proximal valve cavity 64c. Gasses thereby traverse the valve cavities 64a, 64b, and 64c as required for proper operation. Furthermore, a spring 48 or other biasing means is positioned in the valve cavity 47 to apply pressure to a proximal end 46b of the recoil valve 46.

While the weapon simulator 10 is not being fired, the recoil valve 46 will remain in the position shown in FIG. 2.

That is, the recoil valve 46 is held by the spring 48 in the non-triggered position in the valve cavity 47. In this position, the recoil cylinder port 52 is connected to the exhaust port 54 through the central valve gap 64b, such that no pressure is applied to the cylinder and piston assembly 58. However, when an electrical signal opens the pilot valve 44, a low-pressure gas is fed to the pilot channel 50 to apply pressure to the distal end 46a of the recoil valve 46. As pressure is applied to the distal end 46a of the recoil valve 46, the recoil valve 46 is shifted toward the spring 48 and overcomes the force of the spring 48. As the recoil valve 46 moves, the distal valve gap 64a is displaced to close the exhaust port 54, and correspondingly the central valve gap 64b moves to expose the pressure port 56 and a primary gas supply channel 42. Thus, compressed gas from the gas supply 40 flows through the primary gas supply channel 42 through central valve gap 64b and into cylinder port 52. This compressed gas is thereby directed into the piston chamber 59 to force the piston 58, and thus the attached bolt 60 as well, toward the user. As a result, the desired recoil of the bolt 60 is generated.

After firing, the pilot valve 44 is then again closed, such that the spring 48 will overcome the force applied on the recoil valve 46. Consequently, the recoil valve 46 will once again move into position wherein the gas supply channel 42 is directed into proximal valve gap 64c and thus closed and the central valve gap 64b adjoins the exhaust port 54 to discharge and equalize the weapon simulator 10. The remainder of the weapon simulator 10 further returns to the desired resting position to await activation of the pilot valve 44 once again. Once in the resting position, the weapon simulator 10 waits for the next firing situation by the user.

Thus, although there have been described particular embodiments of the present invention of a new and useful GAS OPERATING SYSTEM FOR FIREARM SIMULATORS, it is not intended that such references be construed as limitations upon the scope of this invention except as set forth in the following claims.

What is claimed is:

1. An isolated weapon simulator having a bolt providing recoil for a user when said weapon simulator is fired, said weapon simulator comprising:
   a housing including a piston chamber and a piston positioned in said chamber, said piston connected to the bolt;
   a regulated gas supply detachably attached to said housing;
   a valve chamber in said housing in communication with said regulated gas supply and the bolt;
   a recoil valve positioned in said valve chamber for producing recoil, said recoil valve including a first gate, a second gate, a third gate, and a fourth gate, with a distal valve cavity defined between said first gate and said second gate, a central valve cavity defined between said second gate and said third gate, and a proximal valve cavity defined between said third gate and said fourth gate, said proximal valve cavity being connected with said regulated gas supply while said simulated weapon is not being fired, said recoil valve positioned to control the release of gas from said regulated gas supply to said piston chamber;
   a pilot valve connected to said regulated gas supply;
   a pilot channel connecting said pilot valve to said valve chamber, wherein said pilot valve transmits gas to said distal end of said recoil valve from said gas supply to shift said recoil valve in said valve chamber;
   triggering means for generating an electrical firing signal corresponding to said weapon simulator being fired, said electrical firing signal being transmitted to said pilot valve to open said pilot valve and transmit gas from said regulated gas supply into said pilot channel.

2. The weapon simulator as described in claim 1 further comprising:
   a recoil cylinder port connecting said piston chamber with said valve chamber;
   wherein said recoil valve controls the release of gas through said recoil cylinder port into said piston chamber to move said piston.

3. The weapon simulator as described in claim 1 further comprising:
   a spring positioned in said valve chamber;
   wherein said recoil valve includes a proximal end and a distal end; and
   wherein said spring applies a force to said proximal end of said recoil valve in said valve chamber.

4. The weapon simulator as described in claim 1 further comprising:
   a gas supply channel through said housing connecting said gas supply with said valve chamber;
   wherein said pilot valve conveys gas to said distal end of said recoil valve to displace said recoil valve in said valve chamber;
   wherein said central valve cavity is in communication with said gas supply channel and said recoil cylinder port to allow gas to engage said piston in said piston chamber.

5. The weapon simulator as described in claim 1 further comprising an exhaust port traversing said housing from said valve chamber.

6. A method for generating recoil in a weapon simulator when fired, said weapon simulator having a bolt slidably attached to a firearm housing, said method comprising the steps of:
   a) providing a piston slidably mounted in a piston chamber in the firearm housing;
   b) attaching a regulated gas supply to the firearm housing, said gas supply distributing compressed gas;
   c) providing a recoil valve in a valve chamber having a distal end and a proximal end, said recoil valve including a distal chamber, a central chamber, and a proximal chamber, said distal end of said valve chamber connected to a pilot valve, and said proximal chamber of said recoil valve being connected with said regulated gas supply while said simulated weapon is not being fired;
   d) conveying gas using said pilot valve to said distal end of said valve chamber when an electrical firing signal corresponding to the firing of the simulated weapon is transmitted to said pilot valve;
   e) displacing said recoil valve in said valve chamber; and
   f) forcing gas from said gas supply through said recoil valve into said piston chamber to generate recoil.

7. The method as described in claim 6 wherein step c) further comprises the step of:
   biasing said proximal end of said recoil valve in said valve chamber with a spring.

8. The method as described in claim 7 wherein step e) further comprises the step of:
   forcing gas from said gas supply into said central valve cavity of said recoil valve; and dispersing said gas from said central valve cavity into a recoil cylinder port connected with said distal end of said valve chamber to overcome the biasing force of said spring.

9. An independent weapon simulator generating recoil movement by displacement of a slide assembly when said simulated weapon is fired, said weapon simulator comprising:
a housing defining a piston chamber housing a piston, said piston connected to the slide assembly;
a gas supply to forcefully displace said slide assembly, said gas supply connected to said housing; and
a valve chamber in said housing connected between said gas supply and said slide assembly;
a recoil valve positioned in said valve chamber to control the release of gas from said gas supply to said piston chamber, wherein said recoil valve includes a plurality of gates defining a proximal valve cavity being connected with said gas supply while said weapon simulator is not being fired, a central valve cavity, and a distal valve cavity;
an electrically-controlled valve connected between said recoil valve and said gas supply, wherein said electrically-controlled valve conveys gas to said recoil valve to displace said recoil valve in said valve chamber and supply gas to said piston chamber to displace said piston to generate recoil; and
triggering means for generating an electrical firing signal corresponding to said weapon simulator being fired, said electrical firing signal being transmitted to said electrically-controlled valve to open said electrically-controlled valve and transmit gas from said regulated gas supply into said valve chamber.

10. The weapon simulator as described in claim 9, wherein said electrically controlled valve is a pilot valve.

11. A method for generating recoil in a weapon simulator having a slide attached to a firearm shell when said weapon simulator is fired the shell housing a piston positioned in a piston chamber, said method comprising the steps of:

a) activating a pilot valve in the shell when an electrical firing signal corresponding to the firing of the weapon simulator is transmitted to said pilot valve;

b) conveying gas from a gas supply through said pilot valve to a valve chamber housing a recoil valve having a plurality of gates defining a distal chamber, a central chamber, and a proximal chamber, said proximal chamber of said recoil valve being connected with said regulated gas supply while said weapon simulator is not being fired;

c) shifting said recoil valve in said valve chamber with the gas from said gas supply; and d) displacing the piston in the piston chamber using gas forced into the piston chamber from said gas supply through said recoil valve to generate recoil.

12. The method as described in claim 11, wherein prior to step a), including the step of attaching a gas supply magazine to the shell.

13. The method as described in claim 6, wherein said step c) further comprises providing a recoil valve having a series of flanges defining said distal chamber, said central chamber, and said proximal chamber.

14. The method as described in claim 13, further comprising providing a first flange, a second flange, a third flange, and a fourth flange, said first and second flanges defining said distal chamber, said second and third flanges defining said central chamber, and said third and fourth flanges defining said proximal chamber.

15. The simulator described in claim 9 further comprising a first gate, a second gate, a third gate, and a fourth gate, said first and second gates establishing said proximal valve cavity, said second and third gates establishing said central valve cavity, and said third and fourth gates establishing said distal valve cavity.

* * * * *